United States Patent Office 3,157,534
Patented Nov. 17, 1964

3,157,534
SILICONE COATED ARTICLES AND METHOD
Joseph J. Domicone, Elmira, and Martin E. Nordberg, Corning, N.Y., assignors to Corning Glass Works, Corning, N.Y., a corporation of New York
No Drawing. Filed Jan. 25, 1960, Ser. No. 4,172
11 Claims. (Cl. 117—212)

This invention relates to improvements in the art of silicone coating vitreous surfaces and to articles thus produced. It is particularly adapted to the production of electrical components embodying silicone coated vitreous silicate surfaces.

The term "vitreous," as here used, applies to any material which has a continuous glassy phase and hence an exposed surface at least a portion of which is glassy. This includes glass-ceramic materials, that is materials formed from glass by controlled partial crystallization, as well as the more conventional vitreous materials, such as glasses and ceramics having a glassy phase or matrix. Silicate glasses are widely used in electrical components as substrate or support members, enclosures, and the like because of their thermal and chemical stability and their excellent electrical characteristics, such as high volume resistivity and low dielectric loss factor. The recently developed glass-ceramic materials have also been found particularly useful in producing certain electrical components such as printed circuit assembled.

The extent to which these vitreous materials, particularly the new glass-ceramics, have been employed in electrical component production has been limited by erratic surface resistivity at high relative humidities. Surface resistivity concerns flow of electricity over the surface of an article, as contrasted to volume resistivity which concerns flow through the body of the article. It is well recognized that glass surfaces show a strong affinity for water and that many layers of water molecules may condense or otherwise form on such surfaces, particularly under conditions of high humidity. It is also generally accepted that the erratic surface resistivity of vitreous materials results directly from such water condensation. Experience has shown that glass-ceramic surfaces also have a high affinity for water, and hence present the same problem of erratic surface resistivity.

It is known that silicone materials produce water repellent coatings, and their application to vitreous surfaces has been proposed for this purpose. A remarkable stabilization of surface resistivity has been attained in some instances, but silicone coatings have not heretofore provided a completely satisfactory answer to the problem. In particular, the surface resistivity of vitreous surfaces exposed to chemicals, such as metallizing solutions, has continued to be quite erratic even after silicone coating of the surface as heretofore proposed. A high surface resistivity that will remain stable regardless of humidity conditions is important in most electrical components, but is particularly critical in miniaturized and/or complex components of which printed circuit assemblies are typical.

It is a primary purpose of the present invention to minimize existing problems in the silicone coating of vitreous surfaces. A further purpose is to provide a method of silicone coating articles to impart a permanently high surface resistivity.

Another purpose is to provide improvements in silicone coating of printed circuits and similar electrical components. A more specific purpose is to treat vitreous silicate surfaces, particularly where they have been exposed to destructive chemical treatment, to render such surfaces more receptive to a silicone coating.

In accordance with the present invention, a vitreous surface is prepared for coating with a silicone by chemically dissolving or etching a thin layer from such surface prior to application of the silicone coating. A glass etchant, such as a hydrofluoric acid solution or equivalent fluoride salt etchant, is employed for vitreous silicate surfaces. Preferably, the etched surface is baked out at a temperature in excess of 100° C. and the silicone coating is applied to the etched and baked surface prior to cooling the surface below 100° C. These and other features of the invention are more fully described hereafter.

A simplified flow diagram of the process, as hereafter described and including optional steps, follows:

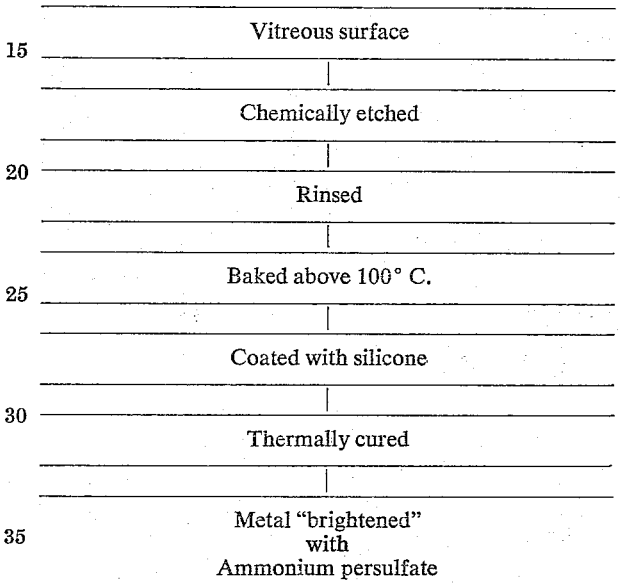

Vitreous surfaces, immediately after cooling from the molten state or after an extended surface bake out, are generally receptive to an adherent, water repellent, silicone coating. We have discovered, however, that this receptivity may be markedly altered during treatment of the glass surface with various chemical solutions. In particular, chemical metallizing solutions can change a vitreous surface and its receptivity to a silicone coating. The exact nature of the change effected by such solutions is not fully understood. The effect produced on subsequent silicone coatings and on surface resistivity indicates deposition of metal salts on such surfaces. There may also be a chemical reaction with a silicate surface to produce a leached, or gel-like, hydrated silica structure thereon. In any event, we have found that the detrimental effect can be avoided by removing a very thin surface layer of the vitreous material as by etching a silicate glass surface with hydrofluoric acid.

For silicate materials, a conventional hydrofluoric acid etching solution of any desired strength may be employed, the time of etching varying with the strength of the etching solution. We have found, for example, that a 30 second dip of a vitreous article in a 20% solution of hydrofluoric acid is sufficient for present purposes. Unduly long exposure to the etching solution, e.g., several minutes, may produce undesirable deposits of insoluble reaction products on a vitreous surface, and hence should be avoided. Alternatively, other fluoride etching materials and techniques equivalent to hydrofluoric acid may be employed. In particular, ammonium bifluoride solutions and fluoborate and fluosilicate solutions are known as glass etchants. It will be appreciated that the etching schedules will be adjusted in accordance with the particular etchant and solution strength employed.

After a vitreous surface is etched to remove a thin surface layer, the article is preferably thoroughly rinsed with distilled water and then subjected to a bake out at a temperature above 100° C., the boiling point of water. While this bake out may be varied to accord with conventional electrical glass bake out practices, we have found that baking at a temperature of 400–450° F. for one hour is adequate to remove absorbed moisture.

A suitable silicone coating solution is applied to the etched and baked surface directly following the bake out step. While any conventional coating procedure may be employed, it is convenient to employ a dilute solution of silicone in organic solvent and dip the baked out article into the silicone solution. In order to avoid condensation of moisture on the baked out surface, it is preferably maintained at a temperature of at least 100° C. after bake out and until the coating process is completed. Where the coating is applied by dipping, the temperature of the board should not exceed the boiling point of the silicone solvent. This avoids undue loss of solvent by evaporation and consequent fluctuation in solution concentration. Temperatures on the order of 225–250° F. have been found satisfactory where xylene and toluene are used as solvents for the silicone. Alternatively the baked out board may be held in an evacuated chamber or a completely dry atmosphere to avoid reabsorption of water prior to coating.

A variety of silicone coating solution capable of providing water repellency have been described in the prior art and are available commercially. Insasmuch as the present invention is not concerned with particular silicones and may utilize any of the known materials for coating vitreous surfaces, the coating materials are not further described. In addition to the solvents already mentioned, unsubstituted or chlorinated hydrocarbons are also frequently used as silicone solvents.

Customarily a silicone coating is thermally cured after application to a surface. In general a 30 minute heat treatment at about 300° C. is satisfactory for curing and setting of the coating. The temperature and time may be varied in the usual manner, the curing time being longer at lower temperatures.

Where a partially metallized vitreous surface is being silicone coated in accordance with the invention, it is frequently necessary to "brighten," that is remove oxides from the surfaces of, the metal terminals or electrodes. However, a conventional brightening solution of sulfuric and nitric acids appear to deteriorate the silicone coating, or at least its adherence to the vitreous surface. We have found that a corresponding brightening effect can be achieved with a solution of ammonium persulfate without producing any appreciable effect on the silicone coating. Thus, copper terminals on a printed circuit assembly may be cleaned by dipping a silicone board for 30 seconds in a 20% solution of ammonium persulfate at about 90–95° C. The treating times and temperatures are in no way critical and may be varied to meet particular conditions.

By way of specifically illustrating the present invention and the improvements achieved therewith, the following specific example is provided:

A group of six commercial printed circuit assemblies was selected for comparative testing. The printed circuit boards were prepared in accordance with processes, and from materials, described in United States Patent No. 2,628,160 and application S.N. 538,510, filed October 10, 1955, both in the name of Stanley D. Stookey. The boards were produced as thin sheets of glass and subsequently photothermally treated, pattern etched, and converted to a glass-ceramic state in accordance with the Stookey teachings. The pattern etched boards were then metallized along the lines of the etched pattern by a conventional electroless nickel metallizing procedure followed by copper plating to produce printed circuit assemblies. Two of the assemblies were retained in untreated form for comparison.

Two of the assemblies were boiled in distilled water for one-half hour, rinsed with distilled water, and baked for a period of 22 hours at 400° F. to remove surface water. The baked boards were cooled to 250° F. and dipped in a 2% silicone coating solution composed of a silicone fluid, commercially available from the Dow Corning Corporation as DC200, dissolved in perchloroethylene. The commercial silicone referred to is a dimethyl polysiloxane having a viscosity of 350 centistokes. The coated circuit assemblies were then cured for a period of three hours at 450° F.

The remaining two assemblies were dipped in a 20% hydrofluoric acid solution for 5 seconds in accordance with the present invention. These etched assemblies were then rinsed with distilled water and baked out at 400° F. for 2 hours. The baked assemblies were cooled to 300° F. and dipped in the silicone solution described above, followed by a curing treatment at 475° F., for two hours.

Surface resistivity (S.R.) measurements were made on the boards in accordance with standard ASTM practice at both 21% and 95% relative humidities (R.H.) The results of these tests are tabulated below:

| Treatment | S.R. in ohms | |
|---|---|---|
| | 21% R.H. | 95% R.H. |
| None | $2.5 \times 10^{14}$ | $7 \times 10^{8}$ |
| Silicone alone | $5.5 \times 10^{13}$ | $1.1 \times 10^{7}$ |
| Etch plus silicone | $5.7 \times 10^{14}$ | $1.3 \times 10^{14}$ |

Subsequent tests on etched and siliconed boards produced in accordance with the present invention have been carried on for periods of time up to 50 days at 100% relative humidity. They have shown substantially no change in surface resistivity of the board due to such treatment.

The present invention is generally applicable to the coating of vitreous silicate surfaces with a silicone material, and permits of numerous modifications particularly with respect to coating materials and surfaces coated. It is particularly effective in producing a stable high surface resistivity on electrical components embodying vitreous silicate members.

What is claimed is:

1. In the fabrication of an electrical article wherein electrically conducting portions are united with a vitreous silicate member and wherein a hydrophobic silicone coating is applied to the exposed surface of such silicate member to provide high surface resistivity characteristics that are electrically stabilized against changes in humidity, the improvement comprising chemically dissolving a thin layer from such silicate surface prior to applying the hydrophobic silicone coating.

2. A method in accordance with claim 1 which further comprises drying the chemically created surface and maintaining it in such dry condition until the silicone coating is applied.

3. A method in accordance with claim 1 which further comprises baking the chemically created surface to remove surface moisture and applying the silicone coating while the surface is at a temperature of at least 100° C.

4. A method of producing an electrical component embodying a vitreous silicate member and having surface resistivity characteristics that are electrically stabilized against changes in humidity, which comprises uniting electrically conducting portions with the surface of the vitreous silicate member, chemically dissolving a thin layer from the remaining exposed portion of the silicate surface, applying a hydrophobic silicone coating to the fresh silicate surface thus created, and curing said silicone coating.

5. A silicone coated article produced in accordance with the method of claim 4.

6. A method in accordance with claim 4 wherein the chemical agent is a solution of hydrofluoric acid.

7. A method of producing an electrical component embodying a vitreous silicate member and having surface resistivity characteristics that are electrically stabilized against changes in humidity, which comprises uniting electrically conducting portions with the surface of the vitreous silicate member whereby the surface characteristics of the member are altered, chemically dissolving a thin layer from the remaining exposed surface of the silicate member, applying a hydrophobic silicone coating to the new surface thus created and curing said coating.

8. A method of improving the surface resistance of an electrical component embodying a vitreous silicate member that has been metallized in part which comprises etching the exposed vitreous surface with hydrofluoric acid and thereafter applying a hydrophobic silicone coating to the new surface thus created and curing said coating.

9. A printed circuit board produced in accordance with claim 8.

10. The method of claim 8 which further comprises baking the etched article at a temperature above 100° C. to remove surface water of hydration, holding the board at a temperature of at least 100° C., dipping in a silicone solution to form a thin adherent coating of hydrophobic silicone on the board and curing the silicone coating.

11. The method of claim 10 which further comprises cleaning terminal portions of the metal with an ammonium persulfate solution to permit soldering of such terminal portions.

References Cited in the file of this patent
UNITED STATES PATENTS

| | | |
|---|---|---|
| 1,535,124 | Laughlin | Apr. 28, 1925 |
| 2,557,786 | Johannson | June 19, 1951 |
| 2,930,106 | Wrotnowski | Mar. 29, 1960 |
| 3,023,139 | Tetterode | Feb. 27, 1962 |

OTHER REFERENCES

"Printed Circuit Techniques": NBS Circular 468, November 15, 1947, page 19.

Meals: "Silicones," Reinhold Pub. Corp., 1959, pages 214 and 215 relied on.

"Condensed Chemical Dictionary," 6th Edition (1961), page 1019.